United States Patent
Nock (10) Patent No.: US 10,413,960 B2
(45) Date of Patent: Sep. 17, 2019

(54) DEVICE FOR THE STEPWISE ADVANCING OF WORKPIECES

(71) Applicant: Sander Automation GmbH, Renchen-Ulm (DE)

(72) Inventor: Klemens Nock, Oberkirch (DE)

(73) Assignee: Sander Automation GmbH, Renchen-Ulm (DE)

(*) Notice: Subject to any disclaimer, the term of this patent is extended or adjusted under 35 U.S.C. 154(b) by 107 days.

(21) Appl. No.: 15/552,827

(22) PCT Filed: Feb. 5, 2016

(86) PCT No.: PCT/EP2016/000200
§ 371 (c)(1),
(2) Date: Aug. 23, 2017

(87) PCT Pub. No.: WO2016/134821
PCT Pub. Date: Sep. 1, 2016

(65) Prior Publication Data
US 2018/0037416 A1 Feb. 8, 2018

(30) Foreign Application Priority Data
Feb. 27, 2015 (DE) .................... 10 2015 002 496

(51) Int. Cl.
*B21D 43/05* (2006.01)
*B65G 25/02* (2006.01)
*B23Q 7/04* (2006.01)

(52) U.S. Cl.
CPC .......... *B21D 43/055* (2013.01); *B23Q 7/046* (2013.01); *B23Q 7/048* (2013.01); *B65G 25/02* (2013.01)

(58) Field of Classification Search
CPC ...... B21D 43/055; B23Q 7/046; B23Q 7/048; B65G 25/02
See application file for complete search history.

(56) References Cited

U.S. PATENT DOCUMENTS

| | | | | |
|---|---|---|---|---|
| 3,939,992 A | * | 2/1976 | Mikulec | B21D 43/055 198/621.1 |
| 4,833,908 A | * | 5/1989 | Sofy | B21D 43/055 198/621.3 |
| 4,895,013 A | * | 1/1990 | Sofy | B21D 43/055 198/621.1 |

(Continued)

FOREIGN PATENT DOCUMENTS

| | | |
|---|---|---|
| DE | 10206773 | 10/2003 |
| EP | 1520640 | 8/2004 |
| JP | H1080736 | 3/1998 |

*Primary Examiner* — Gene O Crawford
*Assistant Examiner* — Keith R Campbell
(74) *Attorney, Agent, or Firm* — Volpe and Koenig, P.C.

(57) ABSTRACT

A device (1) for the stepwise advancing of workpieces, in which a first swing arm (7) and a second swing arm (11) of a drive unit (8, 9) are respectively designed at each gripping rail (2, 3) of two gripping rails (2, 3), which are arranged in parallel to each other, for detecting and transporting the workpieces in a first end region (4) and a second end region (5), which include a gripping region (6) between them. The first swing arm and the second swing arm engage with the respective gripping rail (2, 3) at a distance from one another and movably retain them along a direction of extension of the gripping rail (2, 3).

13 Claims, 9 Drawing Sheets

(56) References Cited

U.S. PATENT DOCUMENTS

| | | | | |
|---|---|---|---|---|
| 6,702,098 B2* | 3/2004 | Zeibig | ............... | B21D 43/055 |
| | | | | 198/468.2 |
| 7,234,912 B2 | 6/2007 | Cisar | | |
| 7,779,664 B2* | 8/2010 | Nock | ............... | B21D 43/055 |
| | | | | 198/621.1 |
| 2003/0183485 A1 | 10/2003 | Zeibig et al. | | |

\* cited by examiner

DEVICE FOR THE STEPWISE ADVANCING OF WORKPIECES

BACKGROUND

The invention relates to a device for incrementally advancing workpieces, having two gripping rails that are arranged parallel to one another and are movable in order to take hold of and transport the workpieces in an advancing direction, wherein each gripping rail has a gripping region between a first end region and a second end region, wherein a respective pivotable first swing arm of a drive unit acts in the first end region and in the second end region, wherein the gripping rail is held so as to be displaceable in its extension direction at a free end of the first swing arm.

Such transport devices are known for example from DE 102 06 773 C1 and have proven successful. For example, such devices are used as advancing devices in machines for punching and/or bending metal workpieces, in order to transport the workpieces between the individual machining stations.

SUMMARY

The invention is based on the object of improving the performance characteristics of such a device.

This object is achieved using one or more features of the invention. In particular, therefore, in a device of the type described at the beginning, to achieve the stated object, the invention proposes that each drive unit has a second pivotable swing arm, which acts on the gripping rail at a distance from the first swing arm in the extension direction, and that the gripping rail is held so as to be displaceable in its extension direction at a free end of the second swing arm. Thus, what is achieved by the invention is, firstly, that the gripping rail is held on the drive unit with improved stiffness, and, secondly, that it is possible to reduce or even completely prevent transmission of tensile load in the gripping rail, which sets in as a result of deflection in the gripping region at the end regions, to the swing arms. In this way, tilting or twisting in the drive unit as a result of deflection of the gripping rail can be avoided or at least reduced. As a result, the performance characteristics are improved. Due to the pivotable swing arms, a distance between the two gripping rails is able to be reduced for gripping and to be increased in order to release the workpiece(s).

In an advantageous configuration, provision can be made for the first swing arm and/or the second swing arm to hold the gripping rail in a plain bearing and/or roller bearing. Thus, transmission or conversion of the tensile load into stressing of the swing arms is able to be reduced or avoided easily. The use of a roller bearing is particularly favorable in order to achieve low frictional losses. This is advantageous particularly when the gripping rail is displaced in its extension direction on the roller bearings in order to transport the workpieces.

In one configuration of the invention, provision can be made for the first swing arm and the second swing arm of a drive unit to be driven by a common electric motor. What is advantageous here is that the complexity in terms of apparatus in the device is able to be kept as low as possible. It is also advantageous that a synchronous movement of the swing arms is easily achievable.

For example, provision can be made for the first swing arm to be coupled mechanically to the second swing arm. In this way, movement sequences that are coordinated with one another at the first swing arm and at the second swing arm are settable easily with respect to one another and able to be provided in a robust manner.

Alternatively or in addition, provision can be made for the first swing arm to be coupled electrically to the second swing arm, for example through the use of a respective electric motor for the first swing arm and for the second swing arm and of a suitable common control unit. What is advantageous here is that it is possible to easily change any coordination of the movement sequences with one another.

In one configuration of the invention, provision can be made for each drive unit to be set up to pivot the first swing arm and the second swing arm in opposite directions to one another. Thus, at least in an end position of a pivoting movement of the swing arms, a particularly large distance between the free ends of the swing arms is achievable. As a result, even more improved stiffness of the mounting can be achieved.

In one configuration of the invention, provision can be made for each drive unit to be set up to pivot the first swing arm and the second swing arm in the same direction as one another. What is advantageous here is that a distance between the free ends of the swing arms is able to be kept constant during the pivoting movement. Thus, a space requirement for carrying out the pivoting movement is able to be configured to be particularly small.

In one configuration of the invention, provision can be made for the two gripping rails to be connected by a cross member which is movable in the advancing direction by a motor. Thus, transport of the workpieces gripped by the gripping rails between different machining stations is able to be carried out.

In one configuration of the invention, provision can be made for the swing arms to be arranged on the respective drive unit so as to be displaceable along a respective pivot axis of the pivoting movement. Thus, workpieces gripped by the gripping rails are able to be lifted for example vertically or in a third dimension, in order to initiate transport of the workpieces. It is particularly favorable here for the swing arms to be displaceable in a motor-drivable manner. In this way, a complete transport movement of the workpieces is able to be carried out in a motor-driven manner.

In one configuration of the invention, provision can be made for a control unit to be set up to pivot the first swing arm of a first drive unit acting on the first end region of the gripping rail, for the one part, and the first swing arm of a second drive unit acting on the second end region of the gripping rail, for the other part, in opposite directions to one another. In this way, a particularly small distance between the free ends is achievable in an end position of the pivoting movement of the pairs of swing arms with respect to one another in the two end regions of the gripping rail. Deflection of the gripping rails is thus able to be reduced even further.

Alternatively or in addition, provision can be made for a control unit, for example the one already mentioned, to be set up to pivot the first swing arm of a first drive unit acting on the first end region of the gripping rail, for the one part, and the first swing arm of a second drive unit acting on the second end region of the gripping rail, for the other part, in the same direction as one another. What is advantageous here is that a distance between the free ends of the swing arms is able to be kept constant along the gripping rail during the pivoting movement. In this way, a space requirement is able to be kept small during the pivoting movement.

In one configuration of the invention, provision can be made for the first swing arm and the second swing arm of a drive unit to be pivotable about mutually parallel pivot axes. In this way, a movement of the gripping rails with respect to one another is achievable easily by pivoting the swing arms. The pivot axes can in this case be arranged in a manner spaced apart from one another or coincide with one another.

In one configuration of the invention, provision can be made for the gripping rails to be arranged above a table. In this way, the workpieces are able to be placed down on the table after the abovementioned transport movement and are able to be provided on the table before the transport movement.

Alternatively or in addition, provision can be made for the gripping rails to be arranged beneath a vertically movable ram. In this way, machining steps are able to be carried out on the workpieces between the transport movements of the workpieces. It is particularly favorable for the ram to carry shaping tools. These shaping tools are able to be set up to carry out a shaping machining step on the workpieces by way of the vertical movement of the ram.

In one configuration of the invention, provision can be made for workpiece receptacles to be formed on the gripping rails. Preferably, the workpiece receptacles are coordinated with the abovementioned shaping tools. What is advantageous here is that the workpieces are able to be held easily and securely on the gripping rails.

BRIEF DESCRIPTION OF THE DRAWINGS

The invention will now be described in more detail by way of exemplary embodiments, but is not limited to these exemplary embodiments. Further exemplary embodiments can be gathered by combining the features of one or more claims with one another and/or with one or more features of the exemplary embodiments.

In the drawings.

DETAILED DESCRIPTION OF THE PREFERRED EMBODIMENTS

Figure 1:
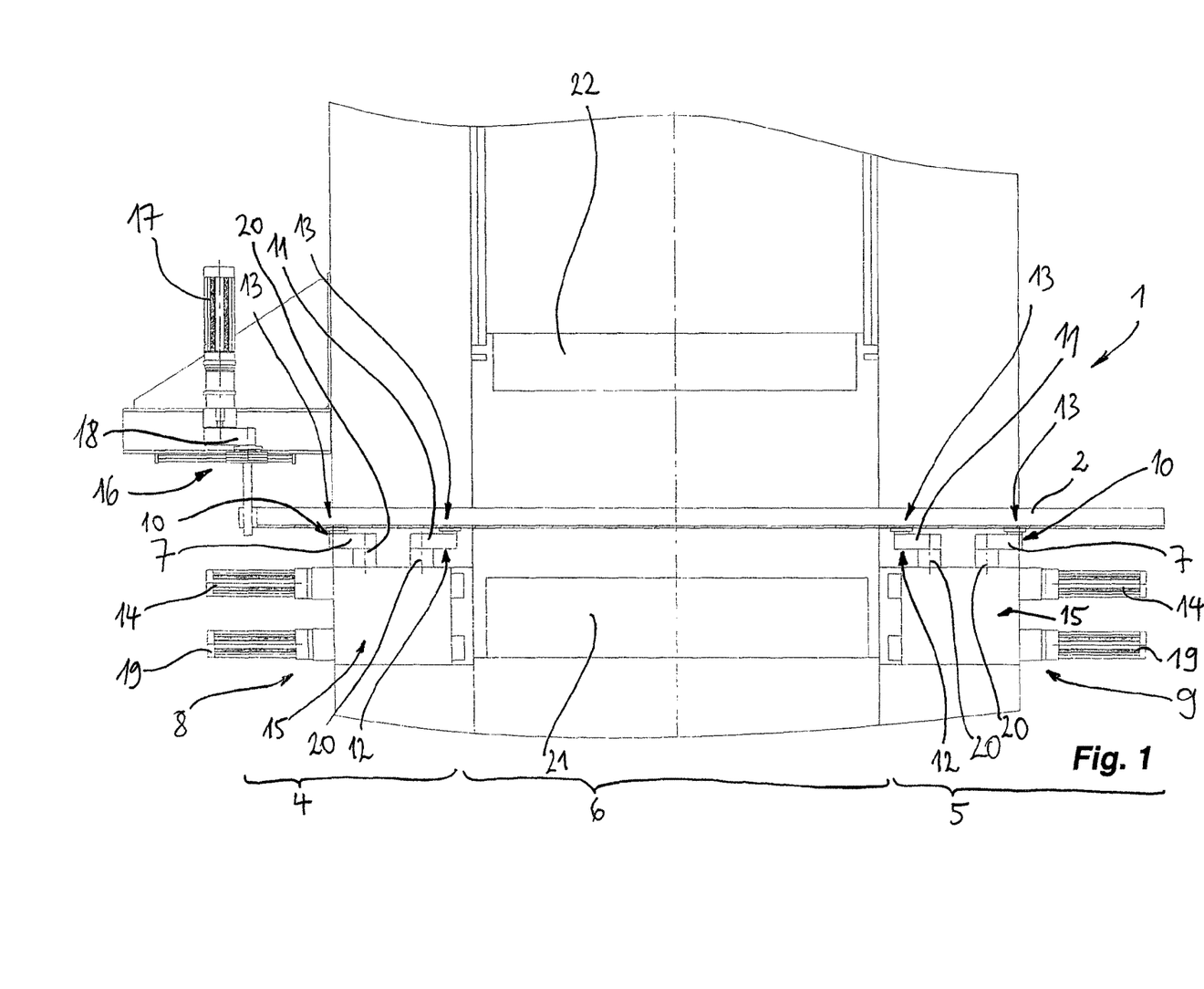
FIG. 1 shows a side view of a device according to the invention for incrementally advancing workpieces.
Figure 2:
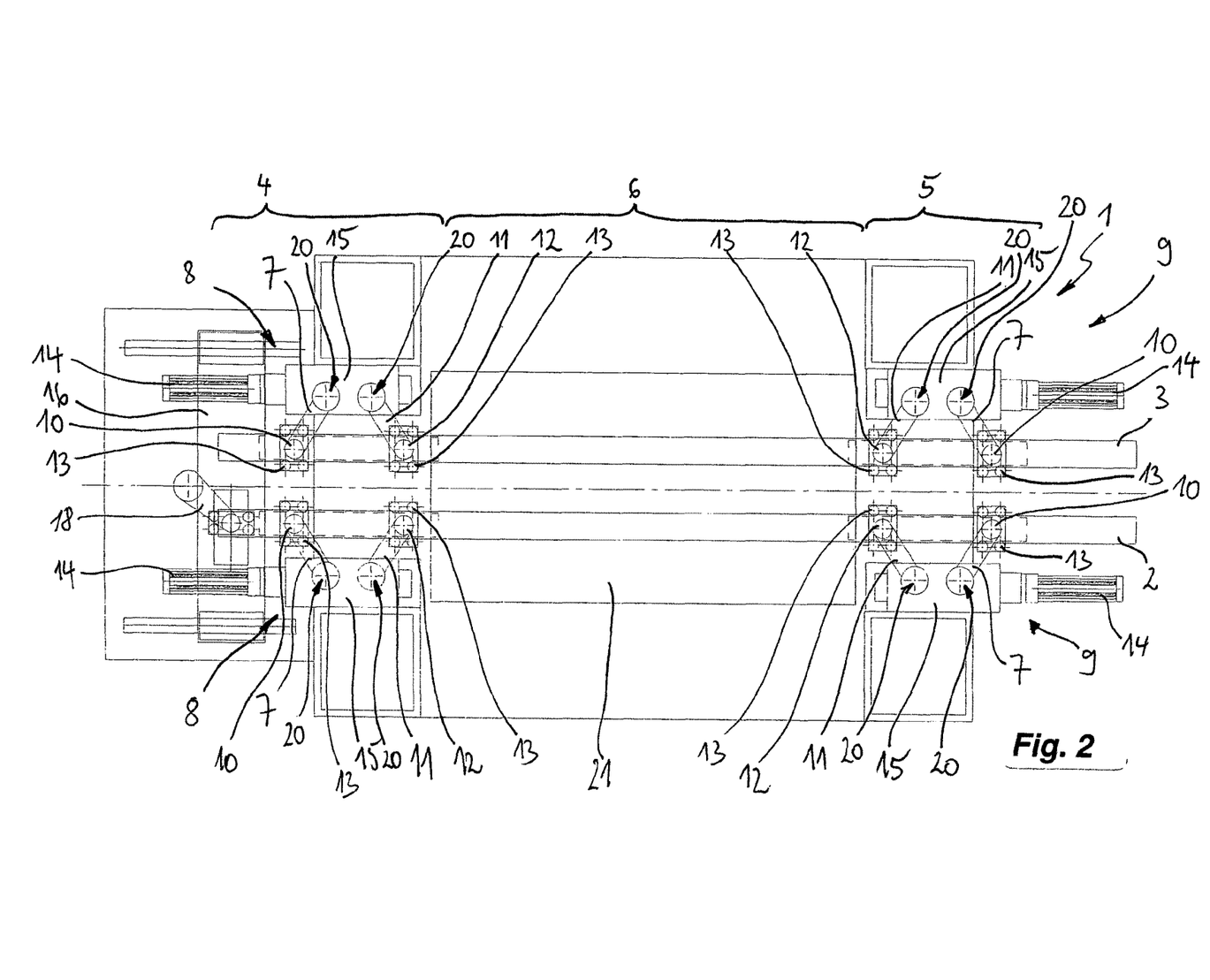
FIG. 2 shows a top view of the device according to the invention according to FIG. 1.
Figure 3:
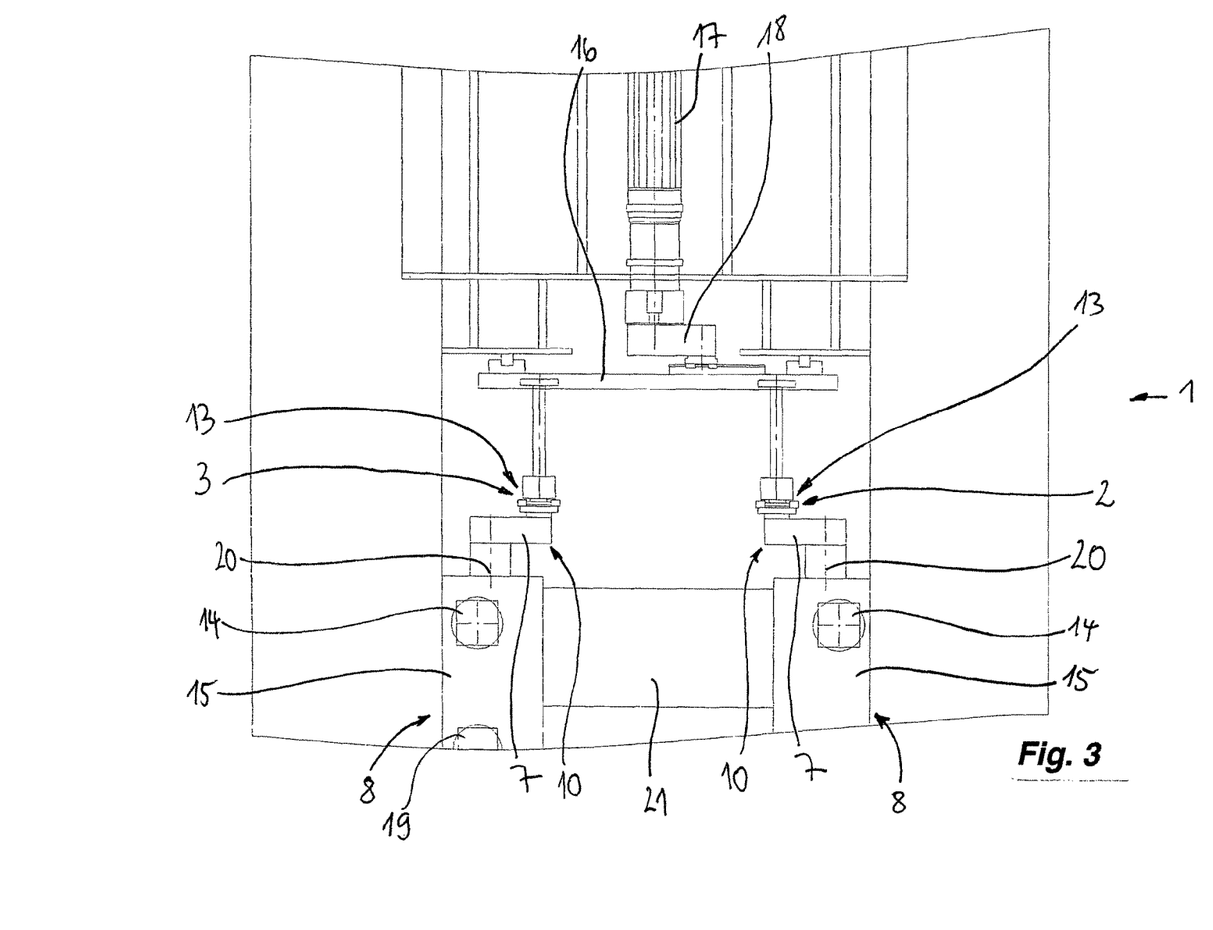
FIG. 3 shows a view in the advancing direction of the device according to the invention according to FIG. 1.

FIG. 1 to FIG. 3 show different views of a device according to the invention, designated 1 overall, for incrementally advancing workpieces.

The device 1 has two gripping rails 2, 3 arranged parallel to one another. The gripping rails 2, 3 are movable toward and away from one another in order to grip and release workpieces which are located between the first gripping rail and the second gripping rail 3.

The gripping rails 2, 3 are furthermore movable together in an advancing direction, in a manner to be described in more detail, in order to transport the gripped workpieces from one machining station to the next machining station.

Each of the gripping rails 2, 3 has a first end region 4 and a second end region 5, between which a gripping region 6 is formed. The respective gripping rail 2, 3 is held in the first end region 4 and the second end region 5, while in the gripping region 6, the abovementioned workpieces are gripped by workpiece receptacles (not illustrated in more detail).

A first swing arm 7 of a drive unit 8, 9 acts in each end region 4, 5 of each gripping rail 2, 3. The drive unit 8 is thus assigned to the first end region 4, while the drive unit 9 is assigned to the second end region 5.

The respective first swing arm 7 is pivotable by way of the drive units 8, 9, with the result that the gripper rails 2, 3 are movable toward or away from one another.

During this pivoting movement, a free end 10 is in each case pivoted along an arc.

The gripping rail 2, 3 is held so as to be displaceable in its extension direction at these free ends 10 of the respectively acting first swing arms 7.

In addition to the respective first swing arm 7, each drive unit 8, 9 has a second swing arm 11.

The second swing arms 11 are likewise configured in a pivotable manner and have a respective free end 12, which describes an arc during the pivoting movement.

With their free ends 12, the second swing arms 11 act on the respective gripping rail 2, 3 in the same end region 4, 5 as the one in which the first swing arm 7 of the same drive unit 8, 9 acts.

At the free ends 12, the respective gripper rail 2, 3 is likewise held so as to be displaceable in its extension direction.

The respective free end 12 of the second swing arm 11 of a drive unit 8, 9 is in this case arranged at a distance from the free end 10 of the first swing arm 7 of the same drive unit 8, 9, such that the first swing arm 7 acts on the respective gripping rail 2, 3 at a distance from the second swing arm 11.

In order to achieve displaceability in the extension direction for the gripping rails 2, 3, a plain bearing and/or roller bearing 13, in which the respective gripping rail 2, 3 is mounted, is formed at each free end 10, 12.

In the exemplary embodiment, the plain bearing and/or roller bearing 13 is configured in each case as a roller bearing.

Each drive unit 8, 9 has in each case one electric motor 14, with which the associated swing arms 7, 11 are pivotable in a motorized manner.

To this end, each drive unit 8, 9 has a coupling unit 15, with which the respective first swing arm 7 is mechanically coupled to the respective second swing arm 11. The coupling units 15 each mechanically couple the movements of the swing arms 7, 11 of a drive unit 8, 9 such that the swing arms 7, 11 are pivotable in opposite directions.

For example, to this end, the coupling unit 15 can have a crossed toothed belt and/or an even number of mutually meshing gear wheels and/or a linkage.

The device 1 furthermore has a cross member 16, which is motor-drivable by a second electric motor 17 and is displaceable horizontally in the advancing direction.

To this end, a further swing arm 18 is arranged between the second electric motor 17 and the cross member 16.

The cross member 16 is coupled and connected to the two gripper rails 2, 3, such that, as a result of the displacement of the cross member 16, the gripper rails 2, 3 are movable in the advancing direction and counter to the latter.

In this case, with the first swing arms 7 and second swing arms 11 stationary, the plain bearings and/or roller bearings 13 guide this displacement movement.

This displacement movement is carried out in order to transport the gripped workpieces in the advancing direction between the machining positions.

Each drive unit 8, 9 has a third electric motor 19, with which the first swing arms 7 and the second swing arms 11 are displaceable in the direction of their pivot axes 20.

In this way, the respective gripping rail 2, 3 can be raised and lowered.

Thus, gripped workpieces are able to be set down and lifted. In order to be transported, the workpieces are first of all gripped by the swing arms 7, 11 being pivoted, then lifted by way of the third electric motor 19, and are then transported by way of the second electric motor 17 and subsequently set down and released.

The device 1 has an electronic control unit (not illustrated in more detail), with which the pivoting movements of the swing arms 7, 11 on a drive unit 8 are able to be synchronized with the pivoting movements of the swing arms 7, 11 on the second drive unit 9, which acts on the same gripping rail 2, 3.

In the exemplary embodiment according to FIG. 1 to FIG. 3, this synchronization is set up such that the first swing arms 7 of the first end region 4, for the one part, and of the second end region 5, for the other part, are pivotable with respect to one another.

This results in a movement of the first swing arms 7 in opposite directions to one another and a movement of the second swing arms 11, in each case of the same gripping rail 2, 3, likewise in opposite directions to one another.

In FIG. 1, it can be seen that the pivot axes 20 of the swing arms 7, 11 are oriented parallel to one another in pairs.

Arranged beneath the gripping rails 2, 3 is a table, on which the workpieces to be transported can be set down.

Arranged above the gripping rails 2, 3 is a ram 22, which is vertically movable.

As a result of the vertical movement of the ram 22, the desired deformation is introduced into the workpieces in each machining step. To this end, the ram 22 has shaping tools (not illustrated in more detail).

On the mutually facing sides of the gripping rails 2, 3, workpiece receptacles (not illustrated in more detail), which are able to receive and firmly hold the workpieces, have been introduced into the gripping region 6.

Figure 4:
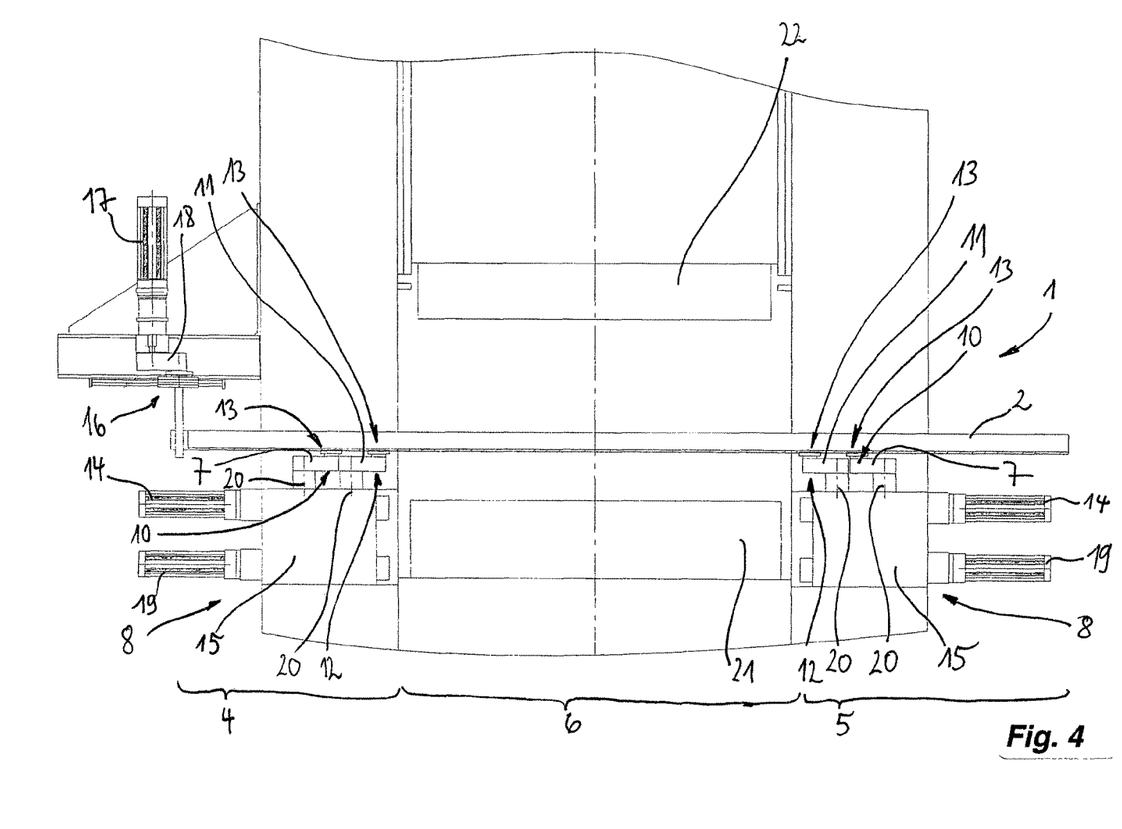
FIG. 4 shows a side view of a further device according to the invention for incrementally advancing workpieces.
Figure 5:
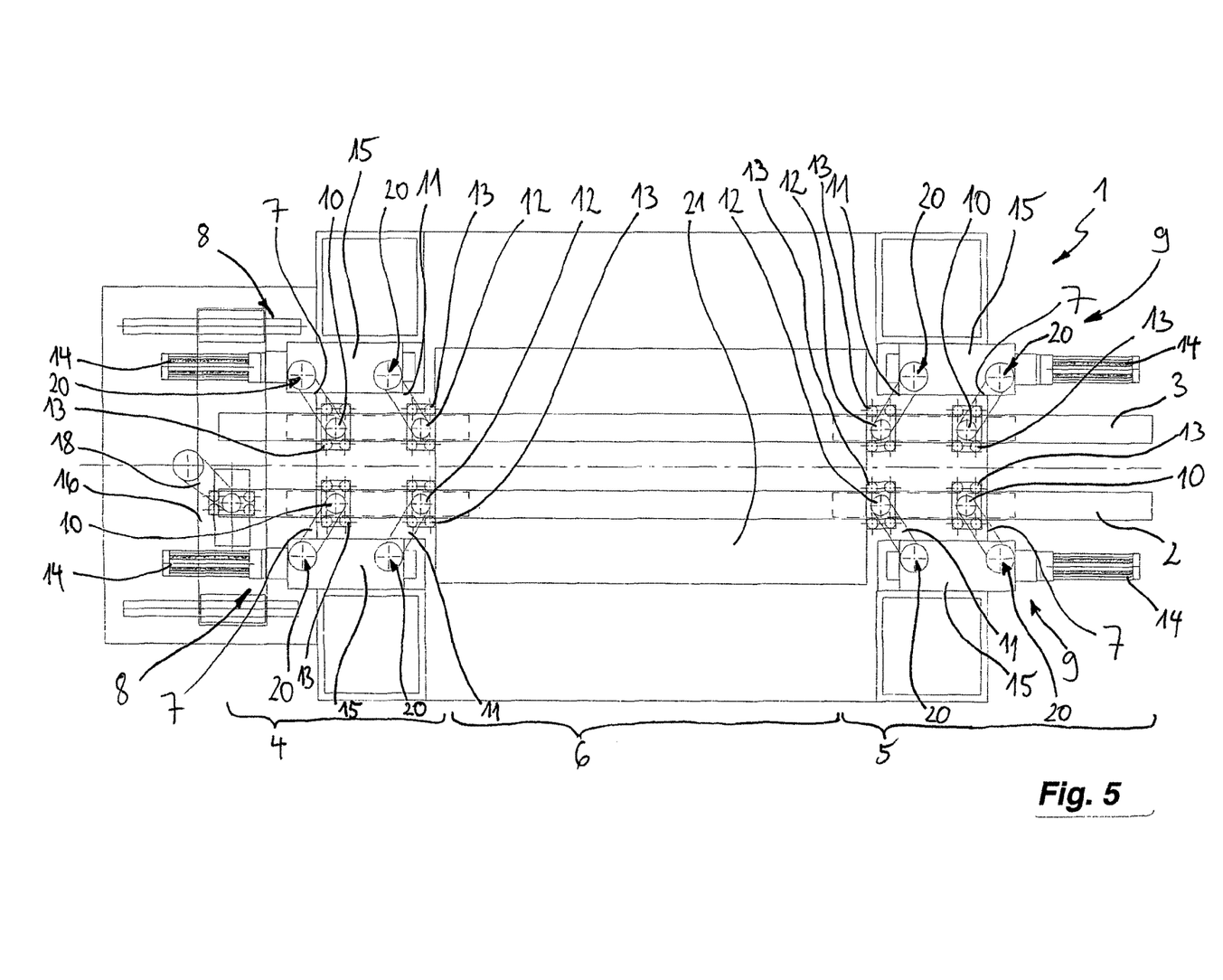
FIG. 5 shows a top view of the device according to FIG. 4.

FIGS. 4 and 5 show a further exemplary embodiment of a device 1 according to the invention. Components and functional units that are functionally and/or structurally of the same type or identical to the exemplary embodiment according to FIG. 1 to FIG. 3 are provided with the same reference signs and are not described separately again. The statements made with respect to FIGS. 1 to 3 therefore also apply, mutatis mutandis, to FIGS. 4 and 5.

The exemplary embodiment according to FIGS. 4 and 5 differs from the exemplary embodiment according to FIGS. 1 to 3 in that the drive units 8, 9 have coupling units 15 which are set up for a pivoting movement of the respective first swing arm 7 in the same direction as the respective second swing arm 11. This can be achieved for example mechanically by toothed belts and/or an odd number of mutually meshing gear wheels. Alternatively or in addition, linkages are also usable.

In this way, during the pivoting movements, the free ends 10, 12 maintain a constant spacing from one another on the gripping rail 2, 3.

The electronic control unit, already mentioned with respect to FIG. 1 to FIG. 3, controls the electric motors 14 such that the first swing arms 7 of a drive unit 8 are pivotable and are pivoted in the opposite direction to the first swing arm 7 of the respectively other, second drive unit 9 of the same gripping rail 2, 3.

Figure 6:
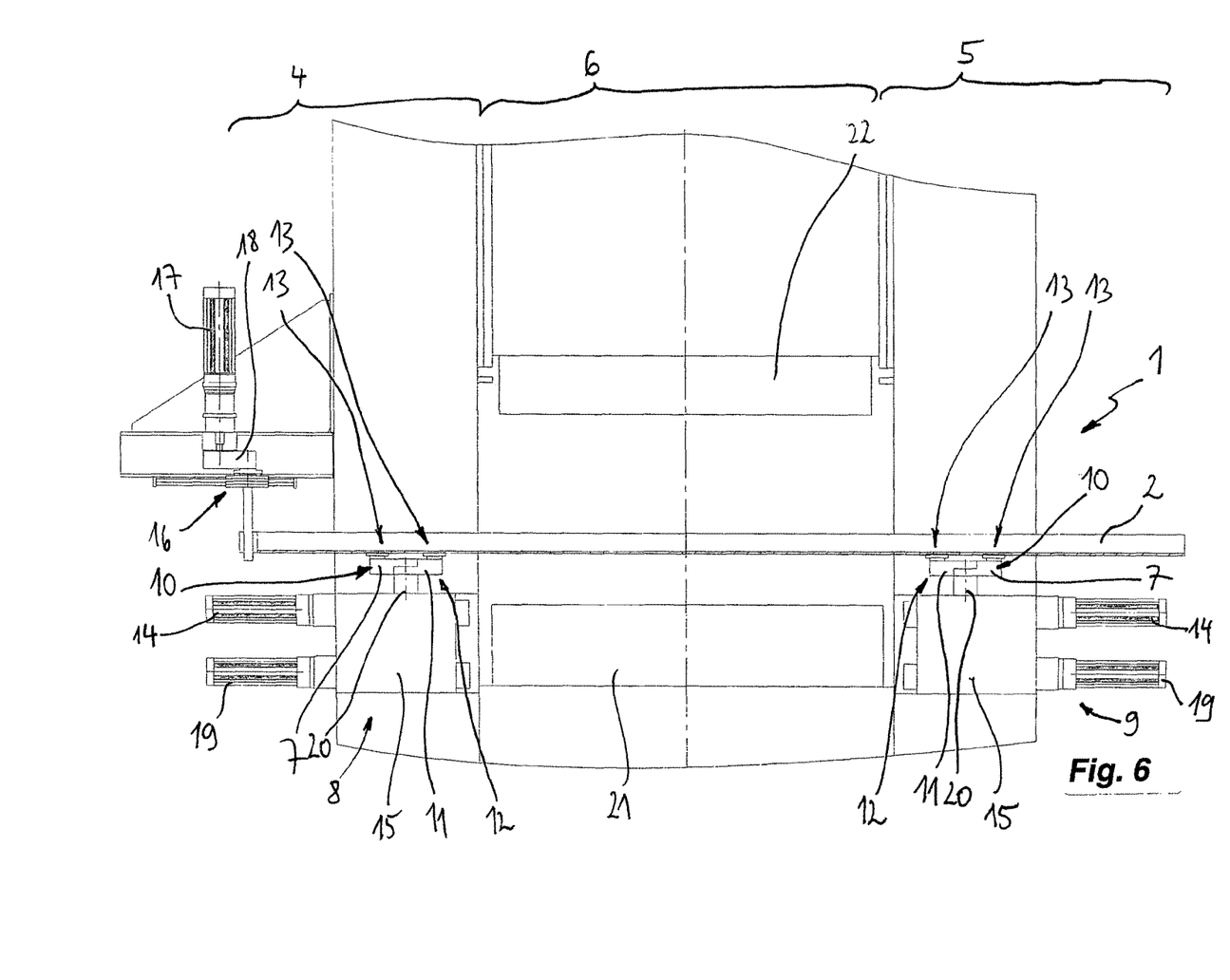
FIG. 6 shows a side view of a further device according to the invention for incrementally advancing workpieces.
Figure 7:
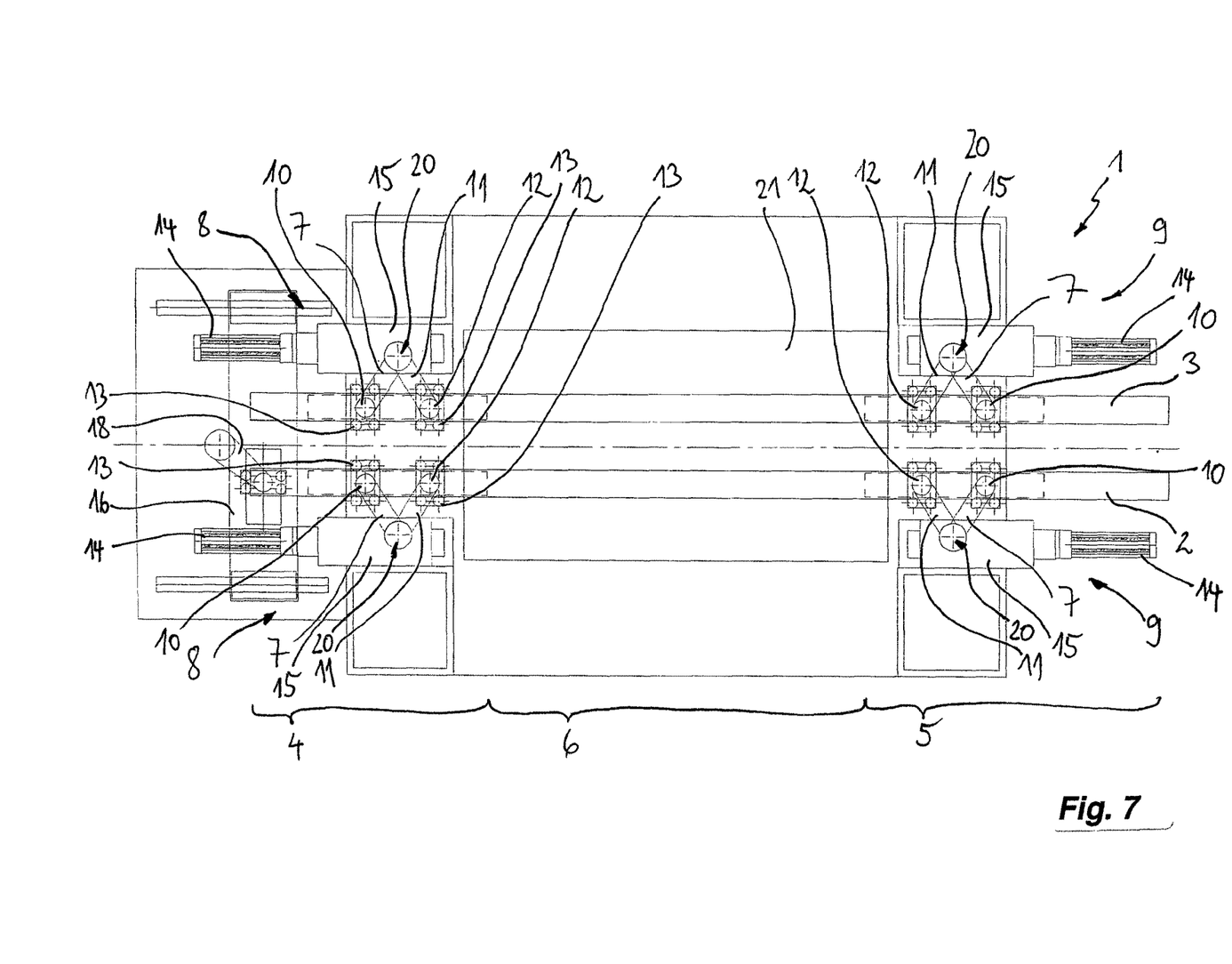
FIG. 7 shows a top view of the device according to FIG. 6.

FIG. 6 and FIG. 7 show a further exemplary embodiment of a device according to the invention. Components and functional units that are functionally and/or structurally of the same type as or identical to the preceding exemplary embodiments are provided with the same reference signs and are not described separately again. The statements made with respect to FIGS. 1 to 5 therefore also apply, mutatis mutandis, to FIGS. 6 and 7.

The exemplary embodiment according to FIGS. 6 and 7 differs from the exemplary embodiment according to FIGS. 1 to 3 in that the first swing arm 7 and the second swing arm 11 of a drive unit 8, 9 have a common pivot axis 20. The pivot axes 20 of a drive unit 8, 9 thus coincide in this exemplary embodiment.

The first swing arm 7 is in this case pivoted in the opposite direction relative to the associated second swing arm 11, this being achieved by a correspondingly set-up coupling unit 15, for example by a linkage.

The first swing arms 7 of the end regions 4, 5 are again pivotable in opposite directions by the abovementioned electronic control unit.

Figure 8:
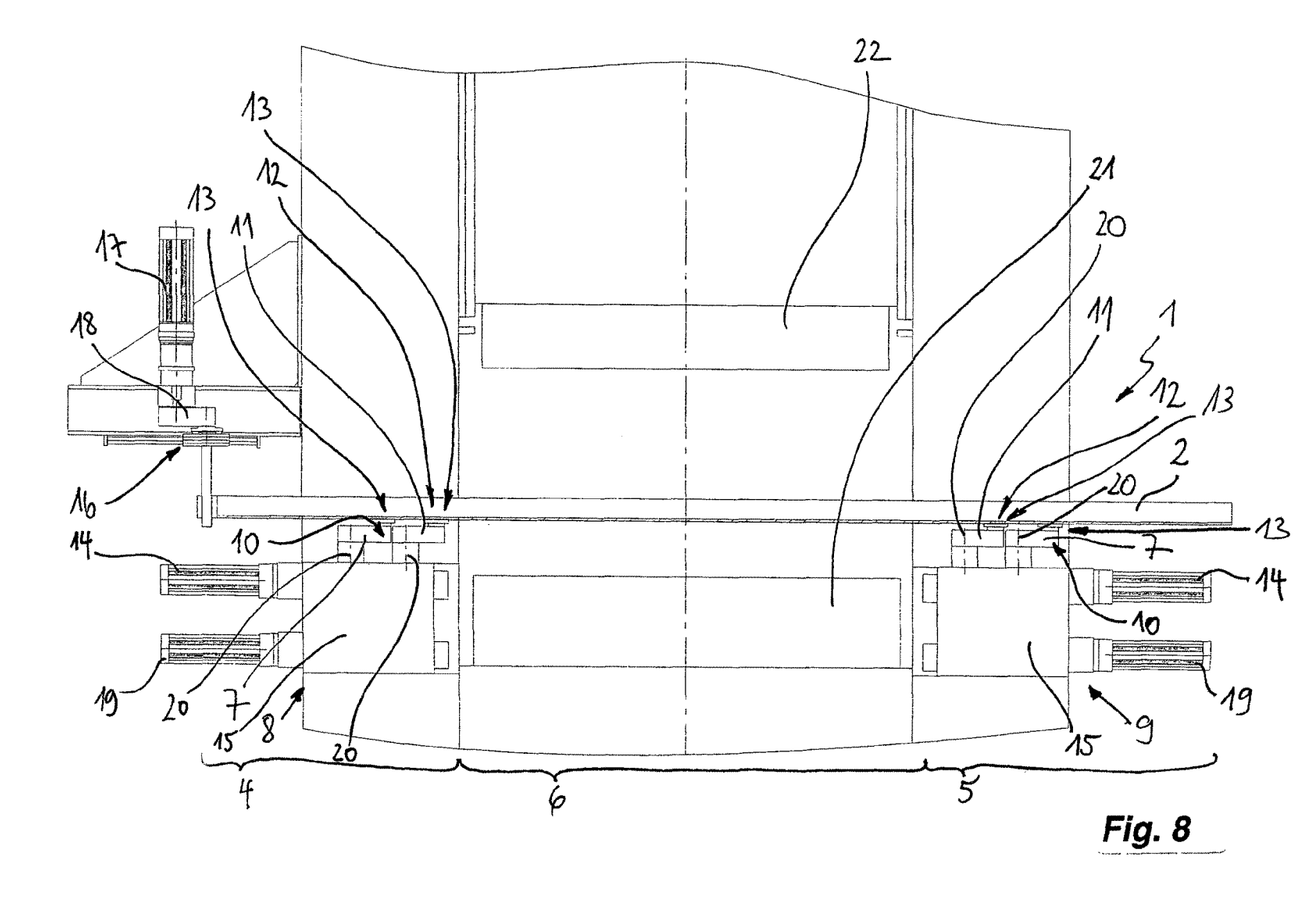
FIG. 8 shows a side view of a further device according to the invention for incrementally advancing workpieces.
Figure 9:
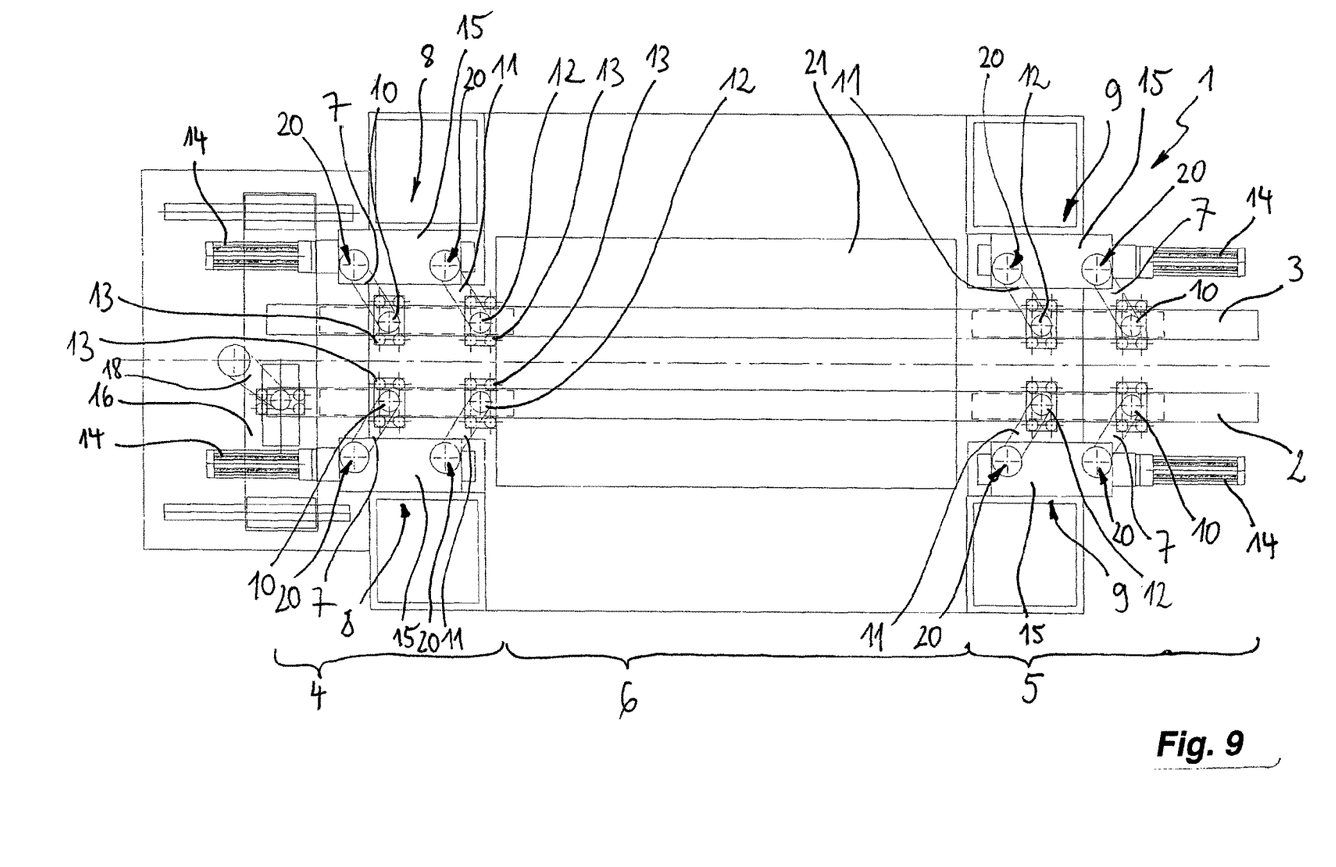
FIG. 9 shows a top view of the device according to FIG. 8.

FIGS. 8 and 9 show a further exemplary embodiment according to the invention of a device 1 for incrementally advancing workpieces. Components or functional units that are functionally and/or structurally of the same type as or identical to the preceding exemplary embodiments are again provided with the same reference signs and are not described separately again. The statements made with respect to FIGS. 1 to 7 therefore also apply, mutatis mutandis, to FIGS. 8 and 9.

The exemplary embodiment according to FIGS. 8 and 9 differs from the preceding exemplary embodiments in that the coupling unit 15 is set up such that the first swing arm 7 of a drive unit 8, 9 is pivotable and is pivoted in the same direction as the second swing arm 11 of the same drive unit 8, 9.

In addition, the electronic control unit is set up such that the electric motors 14 are movable and are moved such that the first swing arms 7 on a gripping rail 2, 3 are pivotable and are pivoted in the same direction as one another. As a result, the distance between the free ends 10 on a gripping rail 2 remains constant over the entire pivoting movement.

In general, it can be stated that the control and/or coupling of the swing arms 7, 11 with respect to one another is/are set up such that the gripping rails 2, 3 remain oriented in a parallel manner during the advancing movements. To this end, depending on the requirements, one of the presented variants or a further variant of the combination of pivoting movements of the swing arms 7, 11 in opposite directions and the same direction relative to one another is usable.

In the device 1 for incrementally displacing workpieces, it is proposed that in each case one first swing arm 7 and a second swing arm 11 of a drive unit 8, 9 are formed on each gripping rail 2, 3 of two gripping rails 2, 3, arranged parallel to one another, for taking hold of and transporting workpieces in a first end region 4 and a second end region 5, which enclose a gripping region 6 between one another, said swing arms 7, 11 acting on the respective gripping rail 2, 3 at a distance from one another and holding said gripping rails 2, 3 in a displaceable manner in an extension direction of the gripping rail 2, 3.

LIST OF REFERENCE SIGNS

1 Device
2 Gripping rail
3 Gripping rail
4 First end region
5 Second end region
6 Gripping region
7 First swing arm
8 Drive unit
9 Drive unit
10 Free end
11 Second swing arm
12 Free end
13 Plain bearing and/or roller bearing
14 Electric motor
15 Coupling unit
16 Cross member
17 Second electric motor
18 Further swing arm
19 Third electric motor
20 Pivot axis
21 Table
22 Ram

The invention claimed is:

1. A device (1) for incrementally advancing workpieces, comprising:
    two gripping rails (2, 3) that are arranged parallel to one another and are movable in order to take hold of and transport the workpieces in an advancing direction,
    each of said gripping rails (2, 3) has a gripping region (6) between a first end region (4) and a second end region (5),
    a respective pivotable first swing arm (7) of a drive unit (8) acts in the first end region (4) and in the second end region (5) of each of the first and second gripping rails (2, 3),
    the gripping rails (2, 3) are each held so as to be displaceable in an extension direction at a free end (10) of each said first swing arm (7),
    each said drive unit (8, 9) has a second pivotable swing arm (11), which acts on each of said gripping rails (2, 3) at a distance from each of the first swing arms (7) in the extension direction, and
    each of said gripping rails (2, 3) is held so as to be displaceable in the extension direction at a free end (12) of each of the second swing arms (11).

2. The device (1) as claimed in claim 1, wherein at least one of the first swing arms (7) or the second swing arms (11) hold(s) an associated one of the gripping rails (2, 3) in at least one of a plain bearing or roller bearing (13).

3. The device (1) as claimed in claim 1, the first swing arm (7) and the second swing arm (11) of each said drive unit (8, 9) are driven by a common electric motor (14).

4. The device (1) as claimed in claim 1, wherein each of the first swing arms (7) is coupled to a respective one of the second swing arms (11) at least one of electrically or mechanically.

5. The device (1) as claimed in claim 1, wherein each said drive unit (8, 9) is set up to pivot the respective one of the first swing arms (7) and the respective one of the second swing arms (11) in opposite directions to one another.

6. The device (1) as claimed in claim 1, wherein the two gripping rails (2, 3) are connected by a cross member (16) which is movable in the advancing direction by a motor.

7. The device (1) as claimed in claim 1, further comprising a control unit that is configured to pivot the first swing arm (7) of a first said drive unit (8) acting on the first end region (4) of a first one of the gripping rails (2, 3), for the one part, and the first swing arm (7) of a second said drive unit (9) acting on the second end region (5) of a second one of the gripping rails (2, 3), for the other part, in opposite directions to one another.

8. The device (1) as claimed in claim 1, wherein the first swing arm (7) and the second swing arm (11) of one said drive unit (8, 9) are pivotable about mutually parallel pivot axes (20).

9. The device (1) as claimed in claim 1, wherein the gripping rails (2, 3) are arranged at least one of above a table (21) or beneath a ram (22) that carries tools.

10. The device (1) as claimed in claim 1, wherein each said drive unit (8, 9) is set up to pivot the respective one of the first swing arms (7) and the respective one of the second swing arms (11) in a same direction as one another.

11. The device (1) as claimed in claim 1, wherein the first and second swing arms (7, 11) are arranged on each of the respective drive units (8, 9) so as to be displaceable along a respective pivot axis (20) of the pivoting movement.

12. The device (1) as claimed in claim 11, further comprising a motor arranged on each of the respective drive units (8, 9) for displacing the respective ones of the first and second swing arms (7, 11) along the respective pivot axis.

13. The device (1) as claimed in claim 1, further comprising a control unit that is configured to pivot the first swing arm (7) of a first said drive unit (8) acting on the first end region (4) of one of the two gripping rails (2, 3), for the one part, and the first swing arm (7) of a second said drive unit (9) acting on the second end region (5) of one of the two gripping rails (2, 3), for the other part, in the same direction as one another.

* * * * *